Dec. 19, 1961  M. C. JAHN  3,013,509
MECHANISM FOR FORMING FILLED DOUGH SHAPES
FOR FRIED PIES AND THE LIKE
Filed March 10, 1959  3 Sheets-Sheet 2

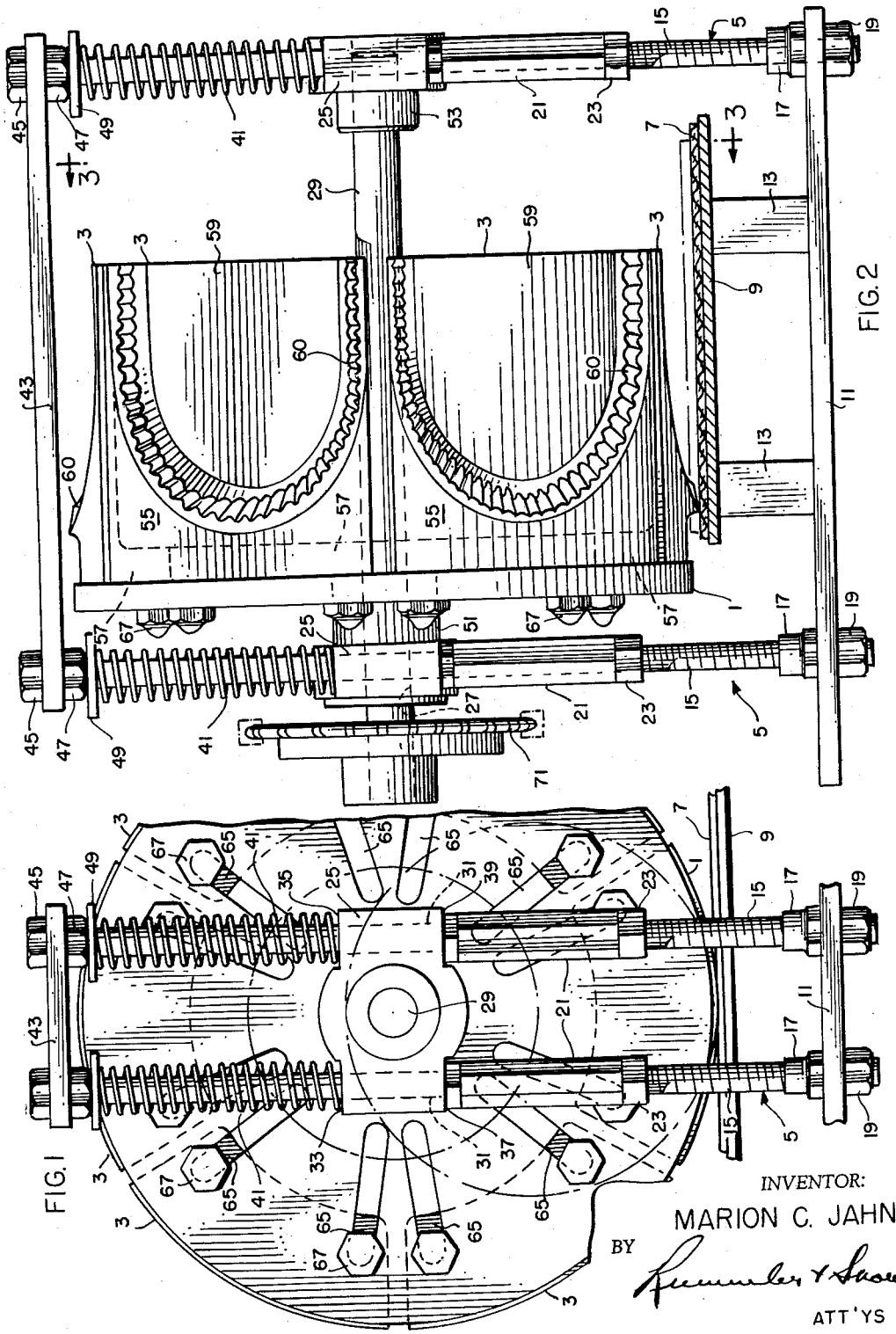

INVENTOR:
MARION C. JAHN
BY
ATT'YS

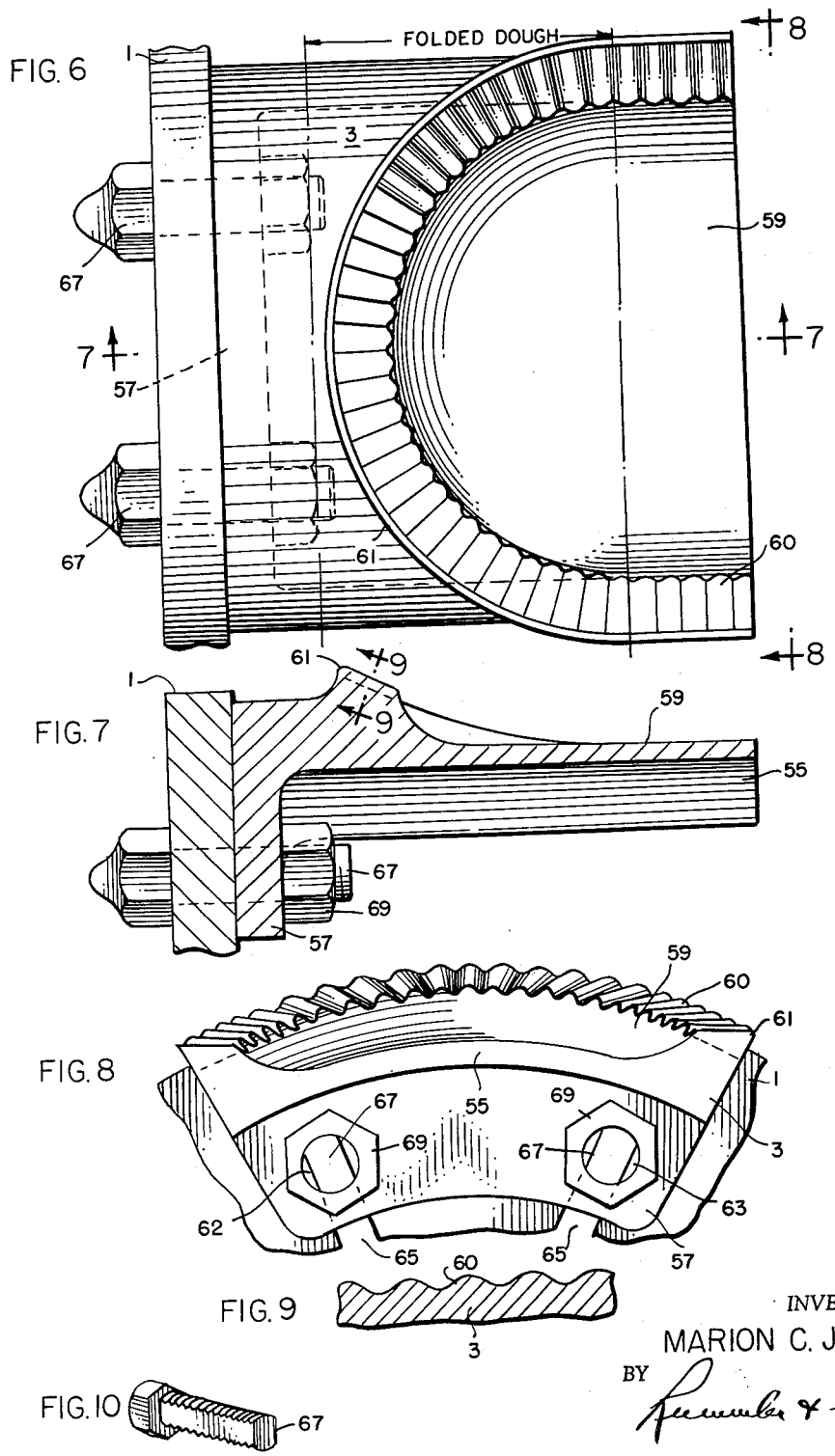

United States Patent Office 3,013,509
Patented Dec. 19, 1961

3,013,509
MECHANISM FOR FORMING FILLED DOUGH
SHAPES FOR FRIED PIES AND THE LIKE
Marion C. Jahn, Chicago, Ill., assignor to Colborne Manufacturing Company, Chicago, Ill., a corporation of Illinois
Filed Mar. 10, 1959, Ser. No. 798,431
9 Claims. (Cl. 107—1)

This invention relates to automatic pie forming, crimping and trimming apparatus and particularly to such devices which utilize a rotating drum including a plurality of angularly spaced peripheral die members.

In particular, this invention is adapted to be used to form, crimp and trim fried pies or turnovers at that stage in the pie making process when the dough sheet surfaces are overlapped and contain filling at spaced intervals between them.

In making prepared pies and turnovers, it is highly desirable to have continuous motion of the materials through all stages of the process so as to minimize handling and time of completion, which also results in the maximum efficient utilization of the apparatus and the minimum expenditure of labor per unit.

Therefore, it is a primary object of this invention to provide a rotary pie forming, crimping and trimming mechanism adapted to be used with a continuous moving length of superimposed dough sheet surfaces having filling therebetween at spaced intervals.

Also, in programming apparatus for making prepared pies, it is often desirable to have processing apparatus which is capable of producing pies of various sizes.

Therefore, it is a further object of this invention to provide a pie forming, crimping and trimming mechanism adapted to be used with a continuous moving length of superimposed dough sheet surfaces having filling therebetween at spaced intervals, which mechanism may be easily adapted to form, crimp and trim filled pie shapes of different size.

Ordinarily, conveyor belts are used to achieve the continuous motion of the pies in process. Therefore, in order to perform the forming, crimping and trimming operation while the pies in process are being moved by the conveyor belt, such mechanisms must be adapted to perform its operations without interfering with the motion of the conveyor belt.

Therefore, it is a further object of this invention to provide a pie forming, crimping and trimming mechanism adapted to be used with a continuous moving length of superimposed dough sheet surfaces having filling therebetween at spaced intervals and moved by means of a conveyor belt, which mechanism is adapted to perform its operations continuously and without interfering with the motion of the belt.

When filling is deposited upon a dough sheet surface and later covered by either a second dough sheet or by folding of the first sheet, it sometimes occurs, especially where the filling is a fruit filling, that seeds and other hard objects will unavoidably be included. Thus, unless provision is made for encountering such hard objects, a pie forming, crimping and trimming mechanism could be damaged or thrown out of commission by such an element.

Therefore, it is a further object of this invention to provide a pie forming, crimping and trimming mechanism adapted to be used with a continuous moving length of superimposed dough sheet surfaces having filling therebetween at spaced intervals, and adapted to compress said surfaces adjacent each of said fillings, and which includes means for resiliently urging said mechanism downwardly to contact said dough sheet surfaces and compress the margins of the formed pies against said conveyor belt to perform the trimming operation; and also to provide means for limiting the downward movement of the forming and trimming means to avoid damage to the conveyor belt.

Other particular objects of this invention are to provide an improved pie forming, crimping and trimming mechanism of simple construction; to provide such a device of unitary construction which can readily be applied to existing conveyor belt mechanisms; to provide such a device which can be easily removed for cleaning purposes; and to provide an improved die for use with such a mechanism which is effective in performing the operations of forming, crimping and trimming doubled dough sheets to form desired shapes for fried pies and turnovers.

A specific embodiment of this invention is shown in the accompanying drawings in which:

FIGURE 1 is a side elevation of the forming, crimping and trimming mechanism, and its manner of mounting for vertical adjustment between the side supports.

FIG. 2 is a front elevational view of the apparatus particularly showing the manner in which the roller or drum shaft is supported at either end.

FIG. 6 is a top plan view of a forming, crimping and trimming die showing its relationship to the folded dough sheet from which the pies or turnovers are to be cut.

FIG. 7 is a sectional view of the same taken substantially on the line 7—7 of FIG. 6 and showing the arrangement of the crimping and cutting edge of the die.

FIG. 8 is an end view of the trimmer die as from the line 8—8 of FIG. 6.

FIG. 9 is a fragmentary sectional view taken substantially on the plane of line 9—9 of FIG. 7 to illustrate the fluted form of the crimping surface of the die member, and FIG. 10 shows one of the mounting bolts by which the die members are secured within the radial slots of the drum.

Figure 3:
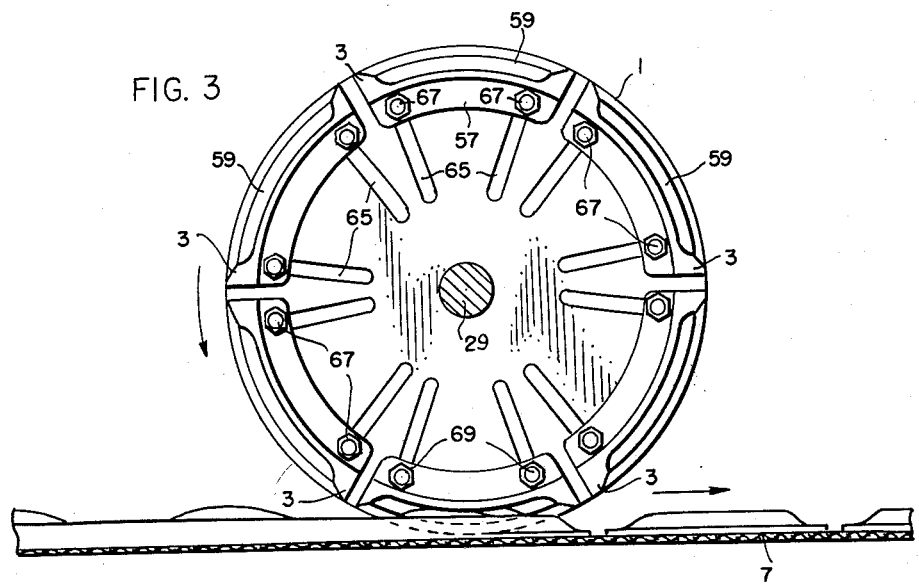
FIG. 3 is a view in elevation showing an end face of the trimming and crimping drum fitted with large sized dies for making of large sized pies.

In the form shown, the forming, crimping and trimming mechanism is comprised generally of a rotatable wheel or drum end plate 1, a plurality of die members 3 secured to the end plate to form the peripheral surface of a forming drum, and vertical support members 5 on which the forming drum is rotatably mounted. In the embodiment shown, the pie forming, crimping and trimming mechanism is mounted on the frame supporting a conveyor belt mechanism at a point in the process where a continuous dough sheet has been supplied at spaced intervals with filling material and the sheet folded or doubled upon itself to cover the spaced fillings. It is to be noted that the instant mechanism may be used not only where one dough sheet has been folded over to cover the filling, but may also be used in those processes in which a second dough sheet is superimposed over the first.

A conveyor belt 7, continuously moving from left to right as viewed in FIG. 1, is preferably supported by means of a supporting plate 9 secured to the conveyor frame structure 11 by means of struts 13 to offer rigidity to the conveyor belt as it pauses beneath the forming, crimping and trimming mechanism.

A pair of vertical threaded supporting studs 15 are mounted on the conveyor frame on each side of the conveyor belt by means of locking nuts 17 and 19 adapted to be threaded on the vertical supporting studs to clamp conveyor frame 11 therebetween. Each vertical supporting stud is further provided with an adjusting sleeve 21 which may be turned on the threaded supporting stud to any desired position and locked in place by means of locking nuts 23.

A bearing block 25 is adapted to be supported on each pair of adjusting sleeves on either side of the conveyor belt, and each bearing block 25 is provided with a central transverse bore 27 adapted to receive the axle 29 of the drum end plate 1. Each bearing block 25 is further provided with vertical bores 31 on either side of the bearing bore 27 and are adapted to receive the vertical supporting studs 15. The upper and lower surfaces of the bearing block 25 are formed with upper horizontal shoulders 33 and 35 and lower horizontal shoulders 37 and 39. Lower shoulders 37 and 39 are adapted to rest on the top of adjusting sleeves 21. A compression spring 41 is adapted to surround each vertical supporting stud 15 and to rest upon the upper shoulders of bearing blocks 25. The upper ends of the vertical supporting studs 15 on each side of the conveyor belt are adapted to be secured together by means of a tie plate 43 to provide rigidity against transverse and longitudinal movement. Two nuts 45 and 47 on each supporting stud are adapted to be threaded toward the tie plate 43 to clamp the supporting studs thereto. Washers 49 beneath the lower nuts 45 are adapted to provide a bearing surface for the upper ends of springs 41.

The drum end plate 1 is generally cylindrical in shape and is provided with a concentric hub portion 51 extending outwardly and adapted to receive and be keyed or otherwise affixed for rotation with a drum axle 29. Hub 51 and a cylindrical thrust bearing 53, fixedly secured to the opposite end portion of the axle 29, combine to retain the drum and axle within the bearing blocks 25 and prevent axial movement thereof.

Secured to one face of the drum end plate 1 are six die segments 3 each having a generally arcuate plate-like body 55 and a radially inwardly projecting attachment flange 57 at one end of the body. As shown, the outer face of the body portion of the die segment is generally formed to conform to a cylinder having its axis coincident with the axis of the shaft 29 and is provided with a recessed portion 59 which is adapted to accommodate the filled portion of the superimposed dough sheet surfaces as will be further explained.

Adjacent the recesses 59 the face is formed with an outwardly projecting generally U-shaped fluted ridge 60 adapted to contact the superimposed dough sheets as the drum is rotated. The contacting face of the ridge 60 is inclined upwardly and outwardly from the recessed portion, as is best seen in FIG. 7, and terminates in a trimming edge 61 adapted to cut through the dough sheet to separate the formed pie therefrom. The trimming edge 61 conforms to a cylindrical surface centered on the axis of the shaft 29. The radial attachment flange 57 is provided with two spaced apertures 62 and 63, and the drum end plate 1 is provided with elongated radially extending slots or apertures 65 which are formed in pairs corresponding to the spaced flange apertures 62 and 63 of the die members 3. A bolt 67 having two opposing flattened surfaces is adapted to be inserted through the drum aperture 65 and through the flange apertures 62 and 63 to receive nut 69 which when tightened secures the die member to the drum plate 1 and assures proper radial and circumferential positioning of the die members 3.

Figure 4:
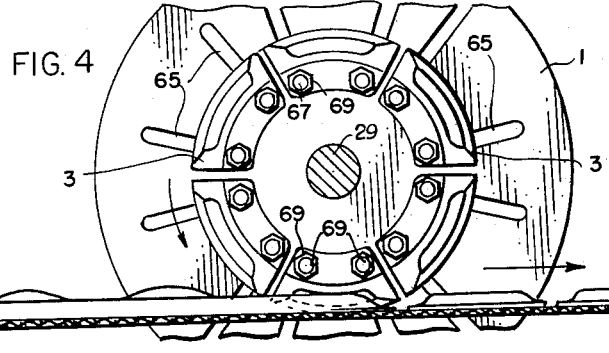
FIG. 4 is a similar view of the trimming and crimping drum shown fitted with smaller dies for the making of small sized pies.
Figure 5:
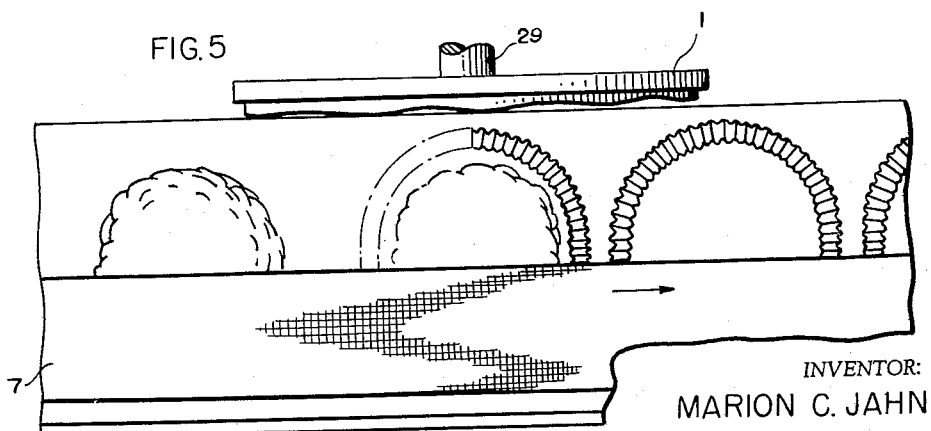
FIG. 5 is a top plan view with the dies broken away to show the shape of the fried pie forms cut out of a folded dough sheet that has been doubled upon itself to contain the filling material.

It is to be noted that when it is desired to make smaller sized pies, smaller die members as shown in FIGURE 4 may be used. In any case the bolt apertures in the attachment flange will be centered on the radial apertures 65, and because these die members are in effect segments of a cylindrical surface will thus be appropriately spaced radially and hence circumferentially on drum end plate 1. This particular arrangement for securing the die members to the drum members provides for the use of a complete assortment of different sized die members for forming pies or turnovers of different sizes.

A drive sprocket 71 is shown in FIG. 1 secured to the outer end of axle 29 and may be connected by means of a chain or other suitable drive means to the conveyor belt drive so that the rotation of the drum plate and die members may be correlated to the movement of the conveyor. In any case the peripheral speed of the die members should be the same as the lineal speed of the conveyor belt.

In operation, a sheet of pie dough is placed upon the conveyor belt, preferably as a continuous strip and by such a sheeting means as that shown in my copending application Serial No. 793,183, filed February 13, 1959, now Patent No. 3,002,471, dated October 3, 1961, and a depositing mechanism automatically deposits filling at appropriately spaced intervals on one longitudinal half portion of the dough sheet. The dough sheet is then folded on its longitudinal centerline and doubled over the filling as it moves along the conveyor belt toward the forming, crimping and trimming mechanism. As the filled and doubled dough sheet approaches the forming, crimping and trimming mechanism, as viewed in FIG. 3, the drum comprising the end plate 1 and the die segments mounted thereon is rotating correlatively to the motion of the conveyor belt and the die members 3 are timed to engage the dough sheet in centered relation with the filled areas to progressively compress the upper and lower surfaces of the dough sheet together in the desired shape around each filling, the inclined fluted edges 60 of the ridge face crimping the upper dough surface around the margins of each pie, and the outer edge 61 of the ridge face contacting the belt surface and trimming away the excess dough from the pie shape thus formed. If seeds are present in the filling and one of the die members is rotated into contact with such a hard object, the action of the spring members 41 permits the trimming and crimping drum to move vertically upwardly to accommodate the seed and to prevent damage to the conveyor belt or breakage of the mechanism.

As viewed in FIG. 2, the outer edge 61 of the inclined ridge face 69 is rotated progressively downward into contact with the dough surfaces as the dough sheet progresses with the conveyor, the edge 61 cutting through the dough against the conveyor belt 7. The spacing of the dies 3 from the belt 7 is adjusted by means of spacing sleeves 21 so that the die edges 61 barely contact the upper surface of conveyor belt 7. Such adjustment must, of course, be made for each size of forming die and according to its distance from the axis of the shaft 29. This, however, is easily done with the present construction and each end of the shaft 29 can readily be adjusted to provide perfectly square engagement of the dies with the conveyor belt surface.

As the conveyor 7 passes on, beneath the forming and trimming drum, the trimmed away portions of the dough sheet are lifted away from the belt, by means not shown, and the formed pies are then delivered to the frying or cooking apparatus.

Although but one specific embodiment of this invention has been herein shown and described, it will be understood that numerous details of the construction shown may be altered or omitted without departing from the spirit of this invention as defined by the following claims.

I claim:

1. A pie forming, crimping and trimming mechanism adapted to be used with a continuous moving body of sheeted superimposed dough surfaces having filling therebetween at equally spaced intervals, said mechanism comprising a drum having an end plate rotatably mounted on an axis extending transversely of and above said superimposed dough sheet surfaces and a plurality of axially projecting die segments arranged in angularly spaced relation at equal intervals on one face of said end plate, said die segments each having a generally arcuate body curved about the axis of said end plate and formed with an outer face recessed to accommodate a filled portion of the superimposed dough sheet surfaces, a crimping and cutting ridge adjacent said recess on each of said die segments for compressing said sheet surfaces together to enclose and seal the filled portion and cutting the enclosed filled portion from the dough body when said segments are compressively engaged therewith during rotation of the drum, and means for rotating said drum in peripheral pressure engagement with said dough body.

2. A pie forming, crimping and trimming mechanism adapted to be used with a continuous moving body of dough comprising parallel superimposed dough sheet surfaces having filling therebetween at spaced intervals, said mechanism comprising a drum having an end plate rotatably mounted on an axis extending transversely of and above said dough body and a plurality of axially projecting die segments arranged in angularly spaced relation on one face of said end plate, said die segments each having a generally arcuate body curved about the axis of said end plate and formed with an outer face recessed to receive and accommodate a filled portion of the superimposed sheet surfaces, an outwardly projecting ridge on each die segment adjacent said recessed portion and having a fluted dough contacting face inclined outwardly from said recessed portion for cutting out and marginally sealing a predetermined shape from the dough body which shape encloses a filled portion of the superimposed sheet surfaces, and means for rotating said drum in peripheral pressure engagement with said moving body of dough.

3. A pie forming, crimping and trimming mechanism adapted to be used with a continuous moving length of dough sheet folded lengthwise to cover a plurality of fillings placed thereon at spaced intervals therealong, said mechanism comprising a drum having an end plate rotatably mounted above said dough sheet on a transversely extending axis parallel with the plane thereof and a plurality of axially extending die segments mounted on one face of said end plate, each die segment having a generally arcuate body conforming to the periphery of a cylinder and being formed with a recess in its outer face to receive and accommodate a filled portion of the folded dough sheet, said recess extending to one end of the segment and having its margin defined by a generally U-shaped ridge projecting radially from the segment body, said ridge having a fluted dough sheet contacting face inclined outwardly from said recess for cutting through the folded dough sheet along the outer periphery of the ridge and simultaneously crimping the cut margins of the said filled portion of the dough sheet when said drum is rotated in peripheral engagement with the dough sheet, said die segments being angularly spaced about the axis of said end plate to conform to the lineal spacing of the fillings along said dough sheet, and means for resiliently holding said drum in peripheral engagement against said dough sheet.

4. The pie forming, crimping and trimming mechanism set forth in claim 3 including means for removably securing and positioning said segments radially on said drum.

5. A pie forming, crimping and trimming mechanism adapted to be used with a continuous moving length of sheeted dough comprising superimposed dough sheet surfaces having filling therebetween at spaced lengthwise intervals, said mechanism comprising an annular end plate rotatably mounted above said superimposed dough sheet surfaces on an axis extending transversely of the dough sheet path and parallel therewith, said end plate being formed with angularly spaced pairs of elongated radially extending apertures, a plurality of die segments extending axially from said end plate, each die segment having a generally arcuate body conforming to a cylindrical surface centered on the axis of said end plate and being formed with an outer face radially recessed to receive a filled portion of the superimposed sheet surfaces when the die segment is forcibly engaged therewith, a crimping and cutting ridge extending along the margin of the recess in each die segment and projecting radially from the die segment body for cutting through said sheet surfaces and crimping the cut edges thereof together, each of said die segments having an attaching flange including a pair of bolts appropriately spaced to extend through respective ones of a pair of said end plate apertures to position and secure said segments radially on said end plate and in angularly spaced relation with each other, means for resiliently urging said die segments into peripheral engagement with said length of sheeted dough, and means for rotating said end plate about its axis to engage said die segments progressively with the moving length of sheeted dough.

6. A pie forming, crimping and trimming mechanism adapted to be used with a conveyor comprising a horizontally moving belt carrying superimposed layers of sheeted dough, said layers of dough having filling therebetween at spaced intervals lengthwise of the conveyor, said mechanism comprising a pair of vertical threaded supporting studs mounted at each side of said conveyor belt and extending upwardly from the plane thereof, a positioning nut threaded on each supporting stud, a bearing block slidably mounted on each pair of said studs and resting on said positioning nuts for vertical adjustment relative to the plane of the conveyor belt, resilient means normally urging said bearing blocks against the respective positioning nuts, a drum rotatably mounted on said bearing blocks above said conveyor and on an axis extending transversely thereof, said drum comprising a plurality of individual angularly spaced peripherally disposed die means adapted to progressively engage and compress said layers of dough around each of said fillings as said drum is rotated and to simultaneously cut out from the dough a predetermined shape enclosing the filling as the dough is carried beneath the drum by said conveyor belt, and means for rotating said drum.

7. A mechanism for forming filled dough shapes for fried pies and the like, comprising a continuous horizontally disposed conveyor belt adapted to carry a length of superimposed layers of sheeted dough having interposed filling material at spaced intervals therealong, support means at each side of said conveyor belt extending vertically above the plane of the conveyor belt, each of said support means having a bearing block mounted thereon for adjustment vertically relative to the conveyor belt plane, a shaft rotatably journaled on said bearing blocks and extending transversely of the conveyor belt above and parallel with the plane thereof, an annular plate mounted on said shaft adjacent one of said support means and laterally outward from the adjacent conveyor belt edge, a plurality of die members mounted endwise on the face of said plate in angularly spaced relation to project axially therfrom and overhang said conveyor belt, each of said die members having an arcuate outer surface radially centered on the axis of said shaft, said die members and plate constituting a drum supported axially on said shaft, a ridge having a cutting edge projecting radially outward from the surface of each of said die members and extending thereover to follow a predetermined outline which when impressed upon said layers of sheeted dough layers cuts a dough form therefrom conforming to said outline, means for adjusting said shaft above said conveyor belt to bring the said ridge into contact with said belt, and means for rotating said shaft and drum to roll said die members over the dough on said belt as the belt travels beneath the drum.

8. A die member for rotary pie forming, crimping and trimming mechanism for use with a continuously moving length of superimposed dough sheet surfaces having filling therebetween at spaced intervals therealong, said member comprising a generally rectangular plate-like body having its outer face curved cylindrically about a predetermined axis and centrally recessed to receive a filled portion of the superimposed sheet surfaces when the said member is impressed thereupon, an outwardly projecting ridge on the outer face of said member following the margin of the recessed portion thereof, said ridge having a fluted dough contacting surface inclined upwardly and outwardly from said recessed portion and terminating in a cutting edge conforming to a predetermined contour, and a mounting flange at one end of said member projecting radially therefrom toward said predetermined axis, said flange including means for removably attaching said flange to the face of an end plate disposed normal to and rotatably mounted on said predetermined axis.

9. A die member according to claim 8 wherein the said ridge follows a generally U-shaped contour about the margin of said recessed portion with the legs of the U-shaped ridge terminating at the end of the member opposite said flange.

References Cited in the file of this patent

UNITED STATES PATENTS

| | | |
|---|---|---|
| Re. 13,367 | Carr | Feb. 13, 1912 |
| 1,236,998 | Tommasini | Aug. 14, 1917 |
| 2,160,783 | McDonald | May 30, 1939 |
| 2,437,202 | Marino | Mar. 2, 1948 |
| 2,588,454 | Abel et al. | Mar. 11, 1952 |
| 2,719,493 | Brooks | Oct. 4, 1955 |